US012680821B2

(12) United States Patent　　　(10) Patent No.:　US 12,680,821 B2
Cordeiro　　　　　　　　　　　　(45) Date of Patent:　　Jul. 14, 2026

(54) VEHICULAR ROUTE PLANNING SYSTEM THAT FACTORS IN RANGE VARIATIONS AND DRIVER PREFERENCE

(71) Applicant: Magna Electronics Inc., Auburn Hills, MI (US)

(72) Inventor: Alan M. Cordeiro, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 49 days.

(21) Appl. No.: 18/804,251

(22) Filed: Aug. 14, 2024

(65) Prior Publication Data

US 2025/0060218 A1　　Feb. 20, 2025

Related U.S. Application Data

(60) Provisional application No. 63/519,627, filed on Aug. 15, 2023.

(51) Int. Cl.
| | |
|---|---|
| *G01C 21/34* | (2006.01) |
| *G01C 21/36* | (2006.01) |
| *G06V 20/56* | (2022.01) |

(52) U.S. Cl.
CPC ..... *G01C 21/3469* (2013.01); *G01C 21/3484* (2013.01); *G01C 21/3691* (2013.01); *G06V 20/56* (2022.01)

(58) Field of Classification Search
CPC ............ G01C 21/3469; G01C 21/3484; G01C 21/3691; G06V 20/56
See application file for complete search history.

(56) References Cited

U.S. PATENT DOCUMENTS

| | | | |
|---|---|---|---|
| 6,678,039 | B2 | 1/2004 | Charbon |
| 6,690,268 | B2 | 2/2004 | Schofield et al. |
| 6,693,517 | B2 | 2/2004 | McCarthy et al. |
| 6,710,770 | B2 | 3/2004 | Tomasi et al. |
| 7,038,577 | B2 | 5/2006 | Pawlicki et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,580,795 | B2 | 8/2009 | McCarthy et al. |
| 7,720,580 | B2 | 5/2010 | Higgins-Luthman |

(Continued)

*Primary Examiner* — Scott A Browne
*Assistant Examiner* — Jason Nguyen
(74) *Attorney, Agent, or Firm* — HONIGMAN LLP

(57)　　　　ABSTRACT

A vehicular navigation system includes an electronic control unit (ECU) having electronic circuitry and associated software. The ECU is operable to determine routes for a vehicle equipped with the vehicular navigation system based at least in part on map data. The ECU, to route the vehicle from a starting location to an ending location, determines one or more candidate routes from the starting location to the ending location. For each determined candidate route, the ECU determines a respective energy efficiency for travel of the vehicle along the respective determined candidate route based at least in part on environmental temperature data for at least one location along the respective determined candidate route. The ECU selects one of the determined candidate routes for the vehicle to travel along based on the determined respective energy efficiency for travel of the vehicle along each determined candidate route.

35 Claims, 1 Drawing Sheet

(56)                References Cited

U.S. PATENT DOCUMENTS

| | | | |
|---|---|---|---|
| 7,855,755 B2 | 12/2010 | Weller et al. | |
| 8,027,029 B2 | 9/2011 | Lu et al. | |
| 8,185,302 B2 * | 5/2012 | Schunder | G01C 21/3469 |
| | | | 701/123 |
| 9,026,368 B2 * | 5/2015 | Fujimoto | G01C 21/3676 |
| | | | 701/410 |
| 9,036,026 B2 | 5/2015 | Dellantoni et al. | |
| 9,146,898 B2 | 9/2015 | Ihlenburg et al. | |
| 9,239,243 B2 * | 1/2016 | Engelhardt | G06F 16/29 |
| 12,187,326 B2 | 1/2025 | Gao | |
| 12,371,027 B2 | 7/2025 | Vasoya et al. | |
| 2010/0148948 A1 | 6/2010 | Murphy et al. | |
| 2010/0152967 A1 | 6/2010 | Murphy et al. | |
| 2010/0245066 A1 | 9/2010 | Sarioglu et al. | |
| 2012/0218412 A1 | 8/2012 | Dellantoni et al. | |
| 2013/0222592 A1 | 8/2013 | Gieseke | |
| 2014/0067206 A1 | 3/2014 | Pflug | |
| 2014/0156134 A1 | 6/2014 | Cullinane et al. | |
| 2014/0218529 A1 | 8/2014 | Mahmoud et al. | |
| 2014/0375476 A1 | 12/2014 | Johnson et al. | |
| 2015/0073620 A1 | 3/2015 | Matsumura | |
| 2015/0124096 A1 | 5/2015 | Koravadi | |
| 2015/0158499 A1 | 6/2015 | Koravadi | |
| 2015/0168157 A1 | 6/2015 | Hoch | |
| 2015/0251599 A1 | 9/2015 | Koravadi | |
| 2015/0344028 A1 | 12/2015 | Gieseke et al. | |
| 2015/0352953 A1 | 12/2015 | Koravadi | |
| 2016/0036917 A1 | 2/2016 | Koravadi et al. | |
| 2016/0210853 A1 | 7/2016 | Koravadi | |
| 2017/0008522 A1 | 1/2017 | Sato et al. | |
| 2017/0052028 A1 | 2/2017 | Choudhury et al. | |
| 2017/0135621 A1 | 5/2017 | Lee et al. | |
| 2017/0136854 A1 * | 5/2017 | Dunne | B60J 1/2088 |
| 2017/0197635 A1 | 7/2017 | Sato | |
| 2017/0222311 A1 | 8/2017 | Hess et al. | |
| 2017/0276788 A1 | 9/2017 | Wodrich | |
| 2017/0329331 A1 | 11/2017 | Gao | |
| 2017/0356994 A1 | 12/2017 | Wodrich et al. | |
| 2017/0371334 A1 | 12/2017 | Nagy et al. | |
| 2018/0015875 A1 | 1/2018 | May et al. | |
| 2018/0045812 A1 | 2/2018 | Hess | |
| 2018/0088574 A1 | 3/2018 | Latotzki et al. | |
| 2018/0178766 A1 | 6/2018 | Oba | |
| 2019/0322154 A1 * | 10/2019 | Ganguly | B60H 1/00742 |
| 2019/0322174 A1 * | 10/2019 | Koebler | B60W 30/143 |
| 2020/0148137 A1 | 5/2020 | Cordeiro | |
| 2020/0164763 A1 * | 5/2020 | Holme | B60L 58/16 |
| 2022/0176939 A1 * | 6/2022 | Poll | B60W 10/26 |
| 2022/0373338 A1 * | 11/2022 | Al-Dahle | G06N 3/08 |

* cited by examiner

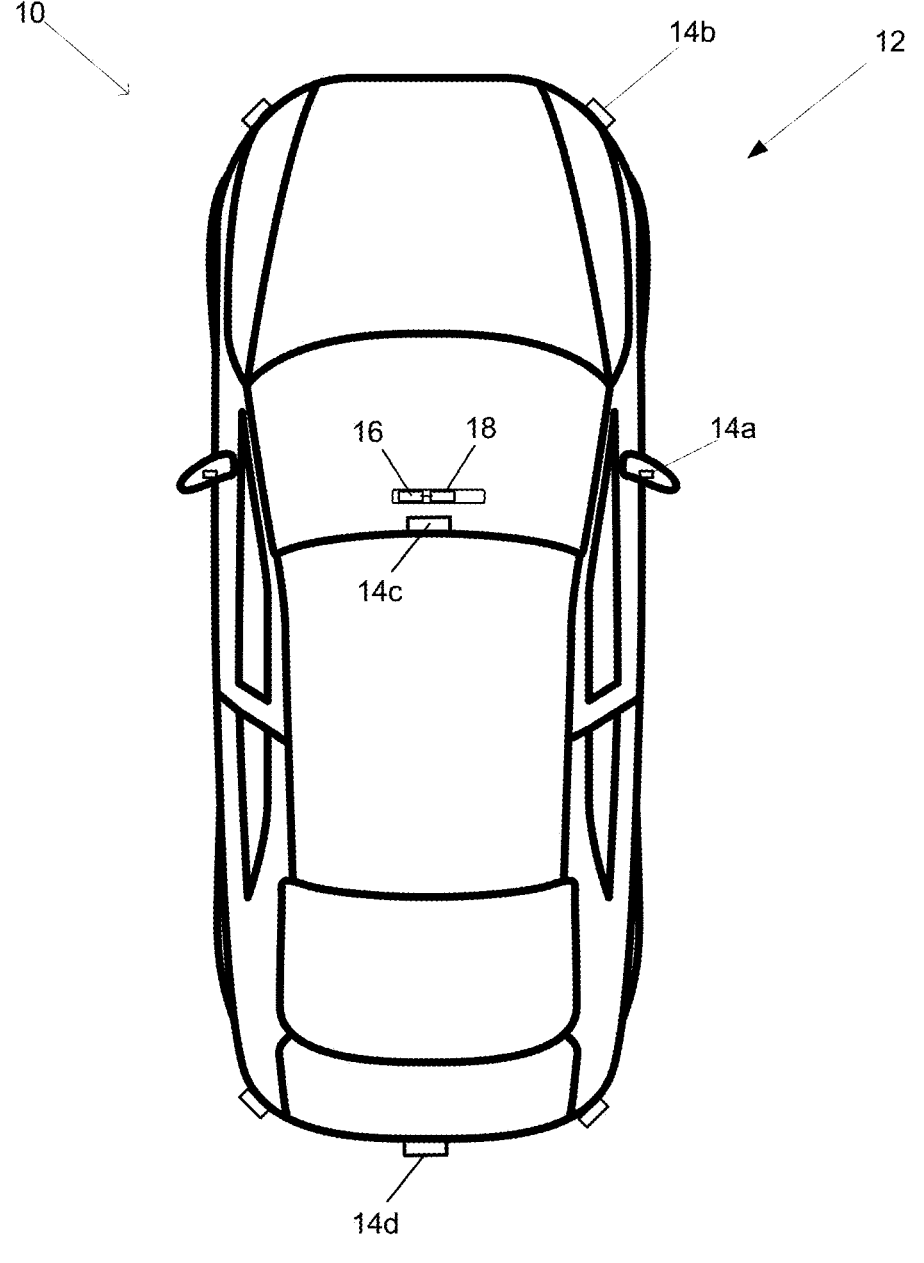

VEHICULAR ROUTE PLANNING SYSTEM THAT FACTORS IN RANGE VARIATIONS AND DRIVER PREFERENCE

CROSS REFERENCE TO RELATED APPLICATION

The present application claims the filing benefits of U.S. provisional application Ser. No. 63/519,627, filed Aug. 15, 2023, which is hereby incorporated herein by reference in its entirety.

FIELD OF THE INVENTION

The present invention relates generally to a vehicle route planning system.

BACKGROUND OF THE INVENTION

Use of navigation systems in vehicles to direct drivers to particular destinations is common and known.

SUMMARY OF THE INVENTION

A vehicular navigation system includes an electronic control unit (ECU) having electronic circuitry and associated software. The ECU is operable to determine routes for a vehicle equipped with the vehicular navigation system based at least in part on map data. To route the vehicle from a starting location to an ending location, the ECU determines one or more candidate routes from the starting location to the ending location. For each determined candidate route, the ECU determines a respective energy efficiency for travel of the vehicle along the respective determined candidate route based at least in part on environmental temperature data for at least one location along the respective determined candidate route. The ECU selects one of the determined candidate routes for the vehicle to travel along from the starting location to the ending location based on the determined respective energy efficiency for travel of the vehicle along each determined candidate route.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a vehicle route planning system.

DESCRIPTION OF THE PREFERRED EMBODIMENTS

A navigation system operates to perform vehicle route planning to determine one or more candidate routes from a starting location to an ending (i.e., destination) location. The navigation system may reside on a vehicle and/or a mobile computing device of a driver (or passenger) associated with the vehicle. The starting location may be the current location of a vehicle or mobile computing device equipped with the navigation system or another location selected or provided by the driver. For example, the navigation system may receive the current location of a vehicle from a global positioning system (GPS) sensor disposed on the equipped vehicle or the equipped mobile computing device, and the current location may be selected as the starting location. The ending location may be provided by the driver or determined by the navigation system based on preferences and/or a history of the driver. For example, the driver may leave work every weekday at 5 pm and drive home. In this example, the navigation system may automatically determine the ending location as the home of the driver without the driver having to provide any input to the navigation system. The navigation system determines the route or routes between the starting location and the ending location based on the current geographic location of the vehicle and the provided or predetermined ending location or destination and based on map data.

Referring now to the drawings and the illustrative embodiments depicted therein, a vehicle 10 (FIG. 1) includes a navigation system 12 that may include at least one exterior viewing sensor, such as a camera and/or radar sensor, which, for example, may be disposed at one or both exterior rearview mirrors 14a at one or both sides of the vehicle and/or may include one or more sensors disposed at one or more corners 14b of the vehicle (e.g., at a corner of a bumper). The sensors may include a forward-viewing camera 14c disposed at an in-cabin side of a windshield of the vehicle and viewing forward of the vehicle through the windshield of the vehicle, and the sensors may include a rearward viewing camera 14d (e.g., a rear backup camera) disposed at a rear portion of the vehicle and viewing rearward of the vehicle. The sensor(s) capture data (e.g., image data or radar data) representing the scene occurring exterior of the vehicle. The navigation system includes a control or electronic control unit (ECU) 16 having electronic circuitry and associated software, with the electronic circuitry including a data processor or image processor that is operable to process image data captured by the sensors. The ECU 16 or the navigation system may be part of a driving assist system of the vehicle 10, where the driver assist system controls at least one function or feature of the vehicle (such as to provide autonomous driving control of the vehicle) responsive to processing of the sensor data captured by the sensors. The data transfer or signal communication from the camera to the ECU may comprise any suitable data or communication link, such as a vehicle network bus or the like of the equipped vehicle. The navigation system 12 may also include a display 18 configured to display the routes to a driver of the vehicle. For instance, the display 18 could include a head-up display (HUD), a center stack display, or a screen of a mobile computing device.

Typically, vehicle route planning is based on a shortest route from a starting location to an ending location. However, since in-vehicle computing capacity and connectivity has increased, vehicle route planning is not so limited. For example, vehicle route planning may also consider traffic information (e.g., congestion, accidents, construction, etc.), vehicular energy consumption, length of the route, total travel time of the route, tolls required along the route, and/or propulsion system or powertrain of the vehicle (e.g., internal combustion engine, hybrid, plug-in hybrid, or fully electric). A ratio of the route that is geo-fenced versus not geo-fenced may also be considered for fully autonomous and other highly automated vehicles to allow drivers more hands-free driving time.

In short, various factors are available for consideration when determining vehicle routes. The optimal route from the starting location to the ending location may vary greatly based on the particular preferences of each driver. Preferences may include the most efficient route, avoiding certain areas or roads, preferred routes, etc. For example, the optimal route for a driver with a preference of time may be the quickest route, while the optimal route for another driver with a preference to avoid tolls may be the quickest route that does not include any tolls. Moreover, the particular preferences of each driver may vary depending on the current situation of the driver. For example, the driver with the preference to avoid tolls may prefer the quickest route (e.g., regardless of tolls) when picking up a child from school and the driver is running late. Accordingly, vehicle route planning systems may enable drivers to set any number of preferences before presenting any routes to the driver. Thus, vehicle route planning may include weighting each of the various factors and determining a weighted sum of all the factors when identifying the optimal route. Additionally or alternatively, the vehicle display may display multiple route options to the driver highlighting the optimized factor for each displayed route and allow the driver to select the route that best suits their particular preferences. For example, the vehicle display may present the quickest route and the most energy efficient route to the driver and allow the driver to select the most suitable route via user input.

Vehicle efficiency has become a particularly important factor for many drivers of vehicles of all powertrains or propulsion systems. A primary factor that impacts vehicle efficiency is energy consumed by the powertrain of the vehicle (such as due to distance of the route(s), speed limits along the route(s), and/or elevation changes along the route(s)). Yet, current vehicle route planning fails to consider energy consumption by the powertrain due to temperature variations along the route(s) and/or energy consumption by the climate control system, such that the actual most efficient route may not be identified by the navigation system. That is, the navigation system may select a route as the most efficient route without considering the temperature variations along the routes such that the selected route does not reflect the actual most efficient route for the vehicle.

Accordingly, implementations herein are directed towards a navigation system that performs vehicle route planning. The navigation system includes an electronic control unit (ECU) that includes electronic circuitry and associated software. The ECU receives a request to route a vehicle from a starting location to an ending location and determines one or more candidate routes from the starting location to the ending location. For each respective candidate route, the ECU determines a respective energy efficiency of the respective candidate route based on environmental temperature data for at least one location along the respective candidate route. Determining the respective energy efficiency may include determining a powertrain loss and a climate control loss. In particular, the powertrain losses and climate control system losses may be determined via processing temperature data at various locations along each respective candidate route. Thus, the ECU may determine the most energy efficient route based on the effects of temperature data. Responsive to identifying the most efficient route, the ECU selects the most energy efficient route between the starting location and the ending location.

A vehicle or mobile device equipped with the navigation system may include a GPS sensor and provide the navigation system a current location of the equipped vehicle or the equipped mobile device. Moreover, the navigation system may be in communication with a weather application via a network. Thus, the navigation system may receive temperature data (i.e., temperature predictions) for each respective region or area along each respective candidate route from the weather application. Here, the temperature data may represent an environmental temperature of the region along a candidate route.

Based on the current location and the temperature data, the navigation system may predict a series of temperatures that the vehicle will be exposed to at the time the vehicle travels through a particular area. For example, a vehicle traveling from point A to point B may travel through point C five hours into the trip. As such, the navigation system processes predicted temperature data for point C in five hours (rather than the current temperature data at point C) when determining the most energy efficient routes. To that end, the navigation system may determine a candidate route and predict a time that the equipped vehicle be at each location along the candidate route. Thereafter, the navigation system may correlate the temperature data and the time that the equipped vehicle at each location along the candidate route.

The two main components of vehicle efficiency include powertrain energy consumption and climate control energy consumption. The environmental temperature may influence each of these different energy consumptions. Powertrain energy consumption has two main contributors, namely, frictional drivetrain energy losses and air resistance (i.e., windage) losses. Frictional losses are proportional to velocity and, depending on the complexity of the powertrain of the vehicle, can be represented by:

$$\text{Friction loss} = C_1 \times \text{Velocity} \qquad (1)$$

$$\text{Frictional Energy Loss} = \text{Friction loss} \times \text{Distance} \qquad (2)$$

In Equation 1, $C_1$ represents a constant frictional loss of the vehicle depending on the powertrain of the particular vehicle. For instance, internal combustion engine, hybrid electric, and fully electric vehicles may all have constant frictional losses predetermined and programmed into the vehicle. On the other hand, air resistance losses are proportional to the square of the velocity and can be represented by:

$$\text{Drag Force} = \frac{1}{2} \times \text{Rho} \times C_d \times A \times \text{Velocity}^2 \qquad (3)$$

$$\text{Air Resistance Loss} = \text{Drag Force} \times \text{Distance} \qquad (4)$$

In Equation 3, Rho represents air density, $C_d$ represents the drag coefficient of the vehicle, and A represents the frontal surface area of the vehicle. In short, the main powertrain energy used by a vehicle depends on the velocity of the vehicle. Thus, traveling at lower velocities leads to lower overall powertrain energy consumption. Consequently, routes where the vehicle can operate at lower velocities (e.g., routes that have lower speed limits) will result in lower energy usage.

The other main component of vehicle efficiency is related to the temperature that the vehicle is exposed to (e.g., temperature of the environment outside of the vehicle) and the resultant climate control energy consumption. Vehicular climate control systems are configured to heat and cool the interior of the vehicle based on a cabin temperature selected by the driver. In extreme cold or extreme heat temperatures, the climate control systems may consume significant amounts of energy thereby impacting the efficiency of the vehicle. That is, due to the large temperature gradient or difference between the very hot or very cold temperature exterior of the vehicle and a comfortable interior cabin temperature, the climate control systems may be required to consume a significant amount of power (e.g., power from the vehicle battery or engine) to maintain the interior cabin temperature. Thus, larger differences between the environmental temperature and the desired cabin temperature cause larger climate control losses and smaller differences between the environmental temperature and the desired cabin temperature cause smaller climate control losses. Notably, combustion engines generate surplus heat such that even in very cold temperatures climate control systems of vehicles with internal combustion engines vehicles may not consume significant amounts of power to heat the interior cabin of the vehicle. On the other hand, in very warm temperatures climate control systems of internal combustion engine vehicles do consume significant amounts of power to cool the interior cabin of the vehicle. Electric vehicles do not include combustion engines and consume significant amounts of power in both very cold and as well as very hot conditions, both for heating and cooling the interior cabin of the vehicle and for maintaining the battery temperature within a desired or optimal operating temperature. Moreover, consuming a significant amount of power in electric vehicles can greatly reduce the range of the electric vehicle and make taking long trips in electric vehicles burdensome due to certain charging restrictions (e.g., lack of charging stations, charging time, etc.).

Due to the significant amount of power consumption by climate control systems, the navigation system accounts for temperature along routes when determining route efficiencies. In some examples, the navigation system accounts for the temperature of each location along the route at predicted time the vehicle will be at the location. Climate control systems include a heat pump and the amount of energy required to run the heat pump depends on a temperature differential between the outside and the interior and the amount of heat that needs to be pumped and can be represented by:

$$Thermal\ Loss\ Per\ Second = \frac{\Delta_T}{R} \qquad (5)$$

$$Energy\ Loss\ Per\ Second = Heat\ Pump\ Efficiency * \Delta_T \qquad (6)$$

In Equation 5, Thermal Loss Per Second represents heat pump efficiency (per second) and R represents the overall thermal resistance of the vehicle. In Equations 5 and 6, $\Delta_T$ represents the temperature difference between the cabin temperature of the vehicle and the temperature of the area surrounding the vehicle. Here, the cabin temperature may be determined based on a driver-selected cabin temperature or a predetermined average cabin temperature. In some examples, the cabin temperature is predicted based on prior cabin temperatures of the vehicle during one or more prior trips. The temperature of the area surrounding the vehicle may be determined based on one or more sensors disposed on the vehicle (e.g., temperature sensor) and or the weather app the navigation system is in communication with. Moreover, the navigation system may determine the temperature difference at each point along each candidate route. The thermal resistance and the heat pump efficiency are constant for any particular vehicle, and thus, can be represented together by $C_3$. Moreover, the total climate conditioning loss depends on the length of the route (in seconds) such that the climate conditioning loss may be represented by:

$$Climate\ System\ Loss = C_3 \times \Delta_T^2 \times \frac{Trip\ Distance}{V} \qquad (7)$$

In Equation 6, Trip Distance/V represents the length of the trip (in seconds). Thus, the total vehicle efficiency of the vehicle for a route may be summarized by:

$$Total\ Loss = \qquad (8)$$
$$Frictional\ Energy\ Loss + Air\ Resistance\ Loss + Climate\ System\ Loss$$

Notably, the powertrain loss (e.g., frictional energy loss and air resistance loss) depends on the square of the vehicle velocity (e.g., $V^2$) while the climate system loss is inversely proportional to the vehicle velocity and proportional to the square of the temperature differential (e.g., $\Delta_T^2$). Thus, when taking into account the energy consumption of the climate control system, the vehicle route planning system cannot simply determine an average velocity of the vehicle along the route to determine an accurate representation of the total loss. Moreover, because the most efficient route in terms of the powertrain loss favors slower velocities, which in turn increases total travel time, the climate control losses (dependent upon travel time) will increase. To combat these competing losses, the navigation system segments each route into multiple segments and determines a respective total loss for each segment of the route. In some examples, each route is segmented based on velocity. That is, each segment includes similar velocities while traversing the segment. For example, a first segment may include a portion of the route with a fifty-five mile-per-hour speed limit and a second segment may include a portion of the route with seventy mile-per-hour speed limit.

In some implementations, the climate system loss (Equation 7) may be further based on an exterior color of the vehicle and/or an amount of sunlight that the vehicle is exposed to along the route(s). That is, vehicles that have a darker exterior paint color (e.g., black) have higher heat gains than vehicles with a lighter exterior paint color (e.g., white). Moreover, vehicles that do not have window tinting may be subject to higher heat gains than vehicles with window tinting as an amount of window tinting can dictate how much sunlight passes through windows of the vehicle to heat the interior of the vehicle. Thus, the color and window tinting of a vehicle may be programmed into the ECU or the vehicle (e.g., programmed into the vehicle by the manufacturer or entered into the navigation system by the manufacturer or driver of the vehicle) such that the navigation system is aware (i.e., receives) the color and window tinting of the vehicle when determining the one or more candidate routes. In some scenarios, receiving temperature data from a weather application and/or temperature sensor does not inform the navigation system how much sunlight (if any) is actually shining on the vehicle, and thus, heating the inside of the vehicle. For example, the weather application may indicate a particular temperature and a partly cloudy condition. Thus, without more, the vehicle may be unable to determine whether the vehicle is in a cloudy area or a sunny area. To that end, the navigation system may estimate the amount of sunlight (based on a "partly cloudy" or "mostly sunny" weather forecast), and the one or more cameras disposed on the vehicle may capture image data (i.e., brightness data) indicative of the amount of sunlight shining on the vehicle as the vehicle approaches and travels along the segments of the route (whereby processing of image data captured by the camera may be used to determine the amount of sunlight at the vehicle and to confirm or modify the route options). Thus, the navigation system may determine the one or more candidate routes and identify the most energy efficient route based on the brightness data.

Accordingly, a driver may request the navigation system to route the vehicle from a starting location to an ending location or target destination. The vehicle may be an internal combustion engine vehicle, a hybrid vehicle, a plug-in hybrid vehicle (PHEV), or a fully-electric vehicle (EV). The navigation system may determine one or more candidate routes from the starting location to the ending location. The one or more candidate routes may be determined based on driver preferences of route planning. For instance, driver preferences may include length of the route, total time required for the route, toll avoidance, vehicle powertrain type, traffic and construction information along each route, geo-fencing percentage, and/or vehicle efficiency. In some examples, the driver may have a strong preference for vehicle efficiency. Thus, the navigation system determines, for each respective candidate route, a respective vehicle efficiency value based in part on environmental temperature data for at least one location along the respective candidate route. The vehicle efficiency value may include the powertrain losses (Equation 2 and 4) and the climate control losses (Equation 7) for a total vehicle efficiency along each candidate route (Equation 8).

The powertrain losses depend on the velocity of the vehicle along each candidate route while the climate control losses depend on the temperature differential (e.g., temperature difference between the interior cabin of the vehicle and the area outside of the vehicle). As discussed above, the candidate route with the lowest powertrain losses may be the slowest route such that the climate control losses increase due to heating or cooling the vehicle for a longer period of time. On the other hand, the candidate route with the lowest climate control losses may be the fastest route such that the powertrain losses increase due to the vehicle traveling at higher velocities.

Thus, to determine accurate vehicle efficiency values, the navigation system may segment each candidate route into multiple segments where each segment includes constant or similar velocities (e.g., speed limits). Then, for each respective segment of the candidate route, the navigation system determines the total vehicle efficiency along the respective segment and adds together (i.e., aggregates) the vehicle efficiencies from each respective segment along the candidate route to form a total vehicle efficiency value for the candidate route. The total vehicle efficiency may include powertrain losses and climate control losses. In some examples, the total vehicle efficiency value for each candidate route is based on a combination of powertrain losses and climate control losses. Here, the navigation system may balance the powertrain loss and the climate control loss to determine an optimal total vehicle efficiency loss.

Finally, the navigation system may select the most energy efficient route between the starting location and the ending location by identifying the respective candidate route having the greatest total efficiency value. In some examples, the navigation system selects the candidate route based on the total efficiency values and/or one or more preferences of the driver. Advantageously, by segmenting the route into multiple segments and considering temperature data along each candidate route, the navigation system can select the most energy efficient route for the vehicle to travel along that balances the tradeoffs between powertrain losses and climate control losses.

Performing the calculation to determine the total energy consumed during the trip may provide an additional benefit for battery electric vehicles. For example, if the driver is driving home where they can recharge their vehicle and some of the suggested routes with the highest energy consumption could drain the battery before the end of the trip, this could be a major decision factor in the selection of the route. The route recommendation algorithm would use the information about the state of the vehicle battery charge and compute which routes will allow (may be all routes will) the vehicle to complete the route without a recharge stop. This could help reduce range anxiety.

For autonomous vehicles suitable for deployment with the system, an occupant of the vehicle may, under particular circumstances, be desired or required to take over operation/ control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically, an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos.

US-2020-0039447; US-2015-0327398; US-2015-0015713; US-2014-0160284; US-2014-0226012 and/or US-2009-0295181, which are all hereby incorporated herein by reference in their entireties.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587, 186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 10,819,943; 9,555,736; 6,690, 268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos.

US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular navigation system, the vehicular navigation system comprising:

an electronic control unit (ECU) comprising electronic circuitry and associated software;

wherein the ECU is operable to determine routes for a vehicle equipped with the vehicular navigation system based at least in part on map data;

wherein the ECU, to route the vehicle from a starting location to an ending location, determines one or more candidate routes from the starting location to the ending location;

wherein the ECU, for each respective determined candidate route, and based at least in part on environmental temperature data for at least one location along the respective determined candidate route, determines a respective energy efficiency for travel of the vehicle along the respective determined candidate route;

wherein determining the respective energy efficiency comprises determining a climate control loss based on the environmental temperature data and a heat gain value for at least one physical characteristic of the vehicle, and wherein the at least one physical characteristic comprises at least one selected from the group consisting of (i) an exterior color of the vehicle and (ii) a window tint of the vehicle; and wherein the ECU, based on the determined respective energy efficiency for travel of the vehicle along each determined candidate route, selects one of the determined candidate routes for the vehicle to travel along from the starting location to the ending location.

2. The vehicular navigation system of claim 1, wherein determining the respective energy efficiency is further based on vehicle temperature data representing a selected interior cabin temperature of the vehicle.

3. The vehicular navigation system of claim 2, wherein determining the respective energy efficiency is based in part on a temperature difference between the environmental temperature data and the vehicle temperature data.

4. The vehicular navigation system of claim 2, wherein the ECU determines the vehicle temperature data based on historical temperature data of the vehicle.

5. The vehicular navigation system of claim 1, wherein determining the respective energy efficiency comprises determining a powertrain loss of the vehicle based on predicted velocities of the vehicle along the respective determined candidate route.

6. The vehicular navigation system of claim 1, wherein determining the respective energy efficiency further comprises determining a powertrain loss of the vehicle.

7. The vehicular navigation system of claim 1, wherein the ECU segments each respective determined candidate route into multiple segments, and wherein the ECU, via processing the multiple segments, determines a respective segment efficiency value along each respective segment of the multiple segments, and wherein the ECU, responsive to determining the respective segment efficiency value along each respective segment, aggregates the respective segment efficiency value for each respective segment forming the respective energy efficiency for each respective determined candidate route.

8. The vehicular navigation system of claim 7, wherein each segment of the multiple segments has a similar speed limit.

9. The vehicular navigation system of claim 1, wherein the ECU resides at the vehicle.

10. The vehicular navigation system of claim 1, wherein the ECU resides on a mobile computing device of a driver associated with the vehicle.

11. The vehicular navigation system of claim 1, wherein determining the respective energy efficiency is further based on an amount of sunlight at the vehicle.

12. The vehicular navigation system of claim 11, further comprising a camera disposed at the vehicle and viewing exterior of the vehicle, wherein the camera is operable to capture image data, and wherein the ECU, via processing by an image processor of image data captured by the camera, determines the amount of sunlight at the vehicle.

13. The vehicular navigation system of claim 1, wherein the ECU receives the environmental temperature data for the at least one location along each respective determined candidate route of the one or more candidate routes from a weather application.

14. The vehicular navigation system of claim 1, wherein the environmental temperature data comprises temperature predictions for the at least one location along each respective candidate route.

15. The vehicular navigation system of claim 14, wherein the ECU predicts a time that the vehicle will travel through the at least one location, and wherein the temperature prediction is based in part on the predicted time that the vehicle will travel through the at least one location.

16. The vehicular navigation system of claim 1, wherein the at least one physical characteristic comprises the exterior color of the vehicle.

17. The vehicular navigation system of claim 1, wherein the at least one physical characteristic comprises the window tint of windows of the vehicle.

18. The vehicular navigation system of claim 1, wherein determining the respective energy efficiency is further based on type of powertrain of the vehicle.

19. The vehicular navigation system of claim 1, wherein selecting the one of the determined candidate routes is further based on one or more preferences of a driver of the vehicle.

20. The vehicular navigation system of claim 1, wherein the selected one of the candidate routes comprises the candidate route with the greatest respective energy efficiency.

21. The vehicular navigation system of claim 1, wherein the vehicle comprises an electric vehicle.

22. A vehicular navigation system, the vehicular navigation system comprising:

an electronic control unit (ECU) comprising electronic circuitry and associated software;

wherein the ECU is operable to determine routes for a vehicle equipped with the vehicular navigation system based at least in part on map data;

wherein the ECU, to route the vehicle from a starting location to an ending location, determines one or more candidate routes from the starting location to the ending location;

wherein the ECU, based on historical temperature data of the vehicle, determines vehicle temperature data representing a selected interior selected interior cabin temperature of the vehicle;

wherein the ECU, for each respective determined candidate route, and based at least in part on environmental temperature data for at least one location along the respective determined candidate route and a temperature difference between the environmental temperature data and the vehicle temperature data, determines a respective energy efficiency for travel of the vehicle along the respective determined candidate route;

wherein determining the respective energy efficiency comprises determining a climate control loss based on the environmental temperature data and a heat gain value for at least one physical characteristic of the vehicle, and wherein the at least one physical characteristic comprises at least one selected from the group consisting of (i) an exterior color of the vehicle and (ii) a window tint of the vehicle; and wherein the ECU, based on the determined respective energy efficiency for travel of the vehicle along each determined candidate route, selects one of the determined candidate routes for the vehicle to travel along from the starting location to the ending location.

23. The vehicular navigation system of claim 22, wherein determining the respective energy efficiency further comprises determining a powertrain loss of the vehicle.

24. The vehicular navigation system of claim 22, wherein the ECU receives the environmental temperature data for the at least one location along each respective candidate route of the one or more candidate routes from a weather application.

25. The vehicular navigation system of claim 22, wherein the environmental temperature data comprises temperature predictions for the at least one location along each respective candidate route.

26. The vehicular navigation system of claim 25, wherein the ECU predicts a time that the vehicle will travel through the at least one location, and wherein the temperature prediction is based in part on the predicted time that the vehicle will travel through the at least one location.

27. The vehicular navigation system of claim 22, wherein the selected one of the candidate routes comprises the candidate route with the greatest respective energy efficiency.

28. A vehicular navigation system, the vehicular navigation system comprising:

an electronic control unit (ECU) comprising electronic circuitry and associated software;

wherein the ECU is operable to determine routes for a vehicle equipped with the vehicular navigation system based at least in part on map data;

wherein the ECU, to route the vehicle from a starting location to an ending location, determines one or more candidate routes from the starting location to the ending location;

wherein the ECU, for each respective determined candidate route, determines a respective powertrain loss of the vehicle based on predicted velocities along the respective determined route;

wherein the ECU, for each respective determined candidate route, and based at least in part on environmental temperature data for at least one location along the respective determined candidate route and the respective powertrain loss of the respective determined candidate route, determines a respective energy efficiency for travel of the vehicle along the respective determined candidate route;

wherein determining the respective energy efficiency comprises determining a climate control loss based on the environmental temperature data and a heat gain value for at least one physical characteristic of the vehicle, and wherein the at least one physical characteristic comprises at least one selected from the group consisting of (i) an exterior color of the vehicle and (ii) a window tint of the vehicle; and wherein the ECU, based on the determined respective energy efficiency for travel of the vehicle along each determined candidate route, selects one of the determined candidate routes for the vehicle to travel along from the starting location to the ending location.

29. The vehicular navigation system of claim 28, wherein determining the respective energy efficiency is further based on vehicle temperature data representing a selected interior cabin temperature of the vehicle.

30. The vehicular navigation system of claim 29, wherein determining the respective energy efficiency is based in part on a temperature difference between the environmental temperature data and the vehicle temperature data.

31. The vehicular navigation system of claim 29, wherein the ECU determines the vehicle temperature data based on historical temperature data of the vehicle.

32. The vehicular navigation system of claim 29, wherein determining the respective energy efficiency further comprises determining a powertrain loss of the vehicle.

33. The vehicular navigation system of claim 28, wherein the ECU receives the environmental temperature data for the at least one location along each respective candidate route of the one or more candidate routes from a weather application.

34. The vehicular navigation system of claim 28, wherein the environmental temperature data comprises temperature predictions for the at least one location along each respective candidate route.

35. The vehicular navigation system of claim 34, wherein the ECU predicts a time that the vehicle will travel through the at least one location, and wherein the temperature prediction is based in part on the predicted time that the vehicle will travel through the at least one location.

* * * * *